United States Patent
Zhang et al.

(10) Patent No.: US 9,756,336 B2
(45) Date of Patent: Sep. 5, 2017

(54) METHOD OF BACKGROUND RESIDUAL PREDICTION FOR VIDEO CODING

(71) Applicant: MEDIATEK Singapore Pte. Ltd., Singapore (SG)

(72) Inventors: Xianguo Zhang, Beijing (CN); Kai Zhang, Beijing (CN); Jicheng An, Beijing (CN)

(73) Assignee: MEDIATEK Singapore Pte. Ltd., Singapore (SG)

( * ) Notice: Subject to any disclaimer, the term of this patent is extended or adjusted under 35 U.S.C. 154(b) by 223 days.

(21) Appl. No.: 14/548,304

(22) Filed: Nov. 20, 2014

(65) Prior Publication Data

US 2016/0150242 A1    May 26, 2016

Related U.S. Application Data

(63) Continuation-in-part of application No. PCT/CN2013/089375, filed on Dec. 13, 2013.

(51) Int. Cl.

| | |
|---|---|
| *H04N 7/12* | (2006.01) |
| *H04N 19/105* | (2014.01) |
| *H04N 19/147* | (2014.01) |
| *H04N 19/17* | (2014.01) |
| *H04N 19/70* | (2014.01) |
| *H04N 19/119* | (2014.01) |

(52) U.S. Cl.
CPC ......... *H04N 19/105* (2014.11); *H04N 19/147* (2014.11); *H04N 19/17* (2014.11); *H04N 19/119* (2014.11); *H04N 19/70* (2014.11)

(58) Field of Classification Search
CPC ..................................................... H04N 19/50
See application file for complete search history.

(56) References Cited

U.S. PATENT DOCUMENTS

| 2013/0335527 A1* | 12/2013 | Takahashi | ............ | H04N 19/597 348/43 |
|---|---|---|---|---|
| 2014/0010305 A1* | 1/2014 | Mironovich | ..... | H04N 19/00763 375/240.16 |

(Continued)

FOREIGN PATENT DOCUMENTS

| CN | WO 2008154825 A1 * | 12/2008 | ........... | G06T 7/2053 |
|---|---|---|---|---|

*Primary Examiner* — Tracy Y Li
(74) *Attorney, Agent, or Firm* — Oblon, McClelland, Maier & Neustadt, L.L.P.

(57) ABSTRACT

A method and apparatus for video encoding or decoding utilizing adaptive background residual prediction is disclosed. The present invention adaptively applies background residual prediction to a current block based on a selection decision. The coding block is split into one or more coding sub-blocks. A reference sub-block in a reference picture is located for a current coding sub-block of the current coding block according to a motion vector associated with the current coding block. A background reference sub-block in a background picture is located for the reference sub-block, where the background reference sub-block is at a first co-located location as the reference sub-block. The method then selects a first predictor or a second predictor to encode or decode the current sub-block based on a selection decision. The first predictor corresponds to the reference sub-block, and the second predictor is derived according to the reference sub-block and the background picture.

22 Claims, 4 Drawing Sheets

(56) References Cited

U.S. PATENT DOCUMENTS

| | | | | |
|---|---|---|---|---|
| 2014/0140408 A1* | 5/2014 | Lee | ................. | H04N 19/00587 |
| | | | | 375/240.16 |
| 2014/0341292 A1* | 11/2014 | Schwarz | ............. | H04N 19/597 |
| | | | | 375/240.16 |
| 2016/0134877 A1* | 5/2016 | Chong | ................. | H04N 19/105 |
| | | | | 375/240.02 |

* cited by examiner

METHOD OF BACKGROUND RESIDUAL PREDICTION FOR VIDEO CODING

CROSS REFERENCE TO RELATED APPLICATIONS

The present invention is a continuation-in-part of and claims priority to PCT Patent Application, Serial No. PCT/CN2013/089375, filed on Dec. 13, 2013, entitled "Methods for Background Residual Prediction". The PCT Patent Application is hereby incorporated by reference in its entirety.

FIELD OF THE INVENTION

The present invention relates to video coding. In particular, the present invention relates to video coding utilizing prediction based on background residual signal.

BACKGROUND AND RELATED ART

For the video sequences captured by a relative static camera, the video contents often consist of some background areas. For example, the surveillance and teleconferencing sequences often exhibit this type of video. The background information can be utilized for video coding to reduce the required bitrate for the video sequence. For example, background prediction is a technique developed to take advantage of similar background data in the reference pictures. The technique utilizes prediction based on global static background to achieve more efficient prediction. Since the generated or selected background picture is static and doesn't need to update or only needs to update infrequently, the background picture can be generated and encoded in high quality without consuming high bitrates. Then the high-quality background picture can provide a high-quality reference for the subsequent pictures, which have similar background areas in the background picture.

One example of video coding standard that adopts the background prediction is AVS (audio and video coding standard) developed by Audio and Video Coding Standard Workgroup of China. The background prediction is used in the surveillance profile of AVS and a short summary of the surveillance profile of AVS is described as follows.

An I-picture can be marked as a G-picture and stored in the reference picture buffer to provide a global background reference for the subsequent frames. With the help of G-picture, the following P-pictures can choose to use G-picture as the last reference in the reference picture lists, or another picture, i.e., S-picture can select the G-picture as its only reference picture with zero motion vectors.

At the encoder side of an AVS based system, the G-picture can either be selected from original input frames or generated from a group of input frames. At both encoder and decoder sides, the reconstructed G-picture is stored in the G-picture reference buffer. In the encoding and decoding process for each current picture, the G-picture can be selected to replace the last reference picture in the reference picture lists.

In this disclosure, a matched block for a current block is defined as the block in the background picture that results in small absolute differences between the matched block and the current block. The corresponding block of the current block is defined as the block in the background picture that is located at the same picture location. The reference block of the current block is defined as the block in the reference picture that is pointed to by the motion vector associated with the current block.

The AVS system as described above uses background reference prediction, which works effectively for the so-called "pure background blocks" having fully matched corresponding block in the high-quality background picture. However, for the so-called "pure foreground blocks", there is hardly any matched corresponding block in the background picture. Therefore, background reference prediction will not help to improve coding efficiency for foreground blocks and should not be selected.

In the AVS system, for a "hybrid-foreground-and-background block", only a partial block is matched with its corresponding block in the background picture. Therefore, background reference prediction is not very effective either since unmatched part cannot be predicted efficiently. The "hybrid-foreground-and-background blocks" usually exist in the boundary areas between foreground areas and background areas.

It is desirable to develop techniques that can also work efficiently for the hybrid-foreground-and-background blocks.

BRIEF SUMMARY OF THE INVENTION

A method and apparatus for video encoding or decoding utilizing background residual prediction is disclosed. The present invention applies background residual prediction to a current block. The present invention can be applied to coding blocks on sub-block basis. Accordingly, a coding block is split into one or more coding sub-blocks. A reference sub-block in a reference picture is located for a current coding sub-block of the current coding block according to a motion vector associated with the current coding block. A background reference sub-block in a background picture is located for the reference sub-block, where the background reference sub-block is at a first co-located location as the reference sub-block. A background current sub-block in a background picture is located for the current sub-block, where the background current sub-block is at a second co-located location as the reference sub-block. The method then forms a predictor to encode or decode the current sub-block based on the reference sub-block, the background reference sub-block and the background current sub-block.

In another embodiment, adaptive background residual prediction is disclosed for an encoding or decoding system. The present invention adaptively applies background residual prediction to a current block based on a selection decision to improve the performance of background prediction. The method selects a first predictor or a second predictor to encode or decode the current sub-block based on a selection decision. The first predictor corresponds to the reference sub-block, and the second predictor is derived according to the reference sub-block and the background picture. The background picture can be generated based on one or more decoded pictures.

One aspect of the invention addresses the selection decision. The selection decision can be derived based on the reference sub-block and the background reference sub-block. For example, either the sum of absolute differences (SAD) or the mean squared error (MSE) between the reference sub-block and the background reference sub-block can be used. The first predictor is selected if the SAD or the MSE is greater than a threshold, and the second predictor is selected if the SAD or the MSE is smaller than the threshold. In another example, the absolute differences between the reference sub-block and the background reference sub-block are used. In this case, the first predictor is selected if the number of absolute differences exceeding a threshold is larger than a selected number, and the second predictor is selected otherwise. The selected number corresponds to a non-negative integer.

The selection decision can also be indicated by a flag. Furthermore, a syntax element can be incorporated in the encoder side and the syntax element is parsed in the decoder side. The syntax element indicates whether to enable adaptive background residual prediction. The syntax element can be incorporated in a picture level or a slice header level of the video bitstream to control the selection of the adaptive background residual prediction for the respective picture or slice.

The syntax element may also be incorporated in coded data for the current coding block to control selection of the adaptive background residual prediction for the current coding block. However, if the current coding block is coded using Merge mode or Skip mode, the syntax element is not needed for the current coding block. In another case, if the current coding block is predicted using prediction units smaller than the current coding block, the syntax element is not used for the current coding block. The syntax element may also be skipped for the current coding block if the width or height of the current coding block is equal to or smaller than a selected size, such as 8 or 16.

When the coding block is partitioned into one or more sub-blocks, the width of the coding sub-block can be from 1 to picture width. The height of the current coding sub-block can be from 1 to picture height.

When the second predictor is used, the second predictor can be derived according to a linear combination of the reference sub-block, the background reference sub-block and a background current sub-block in the background picture, where the background current sub-block is at a second co-located location as the current coding sub-block. For example, the second predictor can be set to a sum of a reference residual and the background current sub-block, and wherein the reference residual is derived by subtracting the background reference sub-block from the reference sub-block.

The motion vector associated with the current coding block can be derived in a picture domain or a background residual domain. When the picture domain is used, the current picture and the reference picture are used to derive the motion vector. When the background residual domain is used, the current background residual data and the reference background residual data are used to derive the motion vector. The current background residual data corresponds to the differences between the current picture and the background picture, and the reference background residual data corresponds to the differences between the reference picture and the background picture.

DETAILED DESCRIPTION OF THE INVENTION

Figure 1:
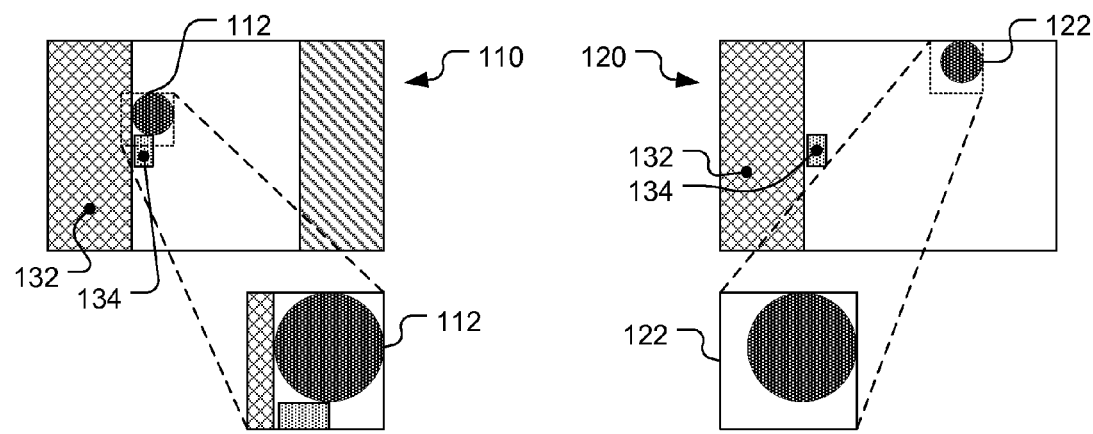
FIG. 1 illustrates an example of a conventional coding system utilizing a background picture for prediction, where the method fails to work in boundaries around background areas.

As mentioned above, background prediction provides efficient compression for blocks in purely background areas. However, for the hybrid-foreground-and-background blocks, the conventional background prediction fails to achieve efficient prediction since only a partial block can match with a block in the background picture. The issue associated with conventional background prediction is illustrated in FIG. 1. Block 112 corresponds to a block in reference picture 110 and block 122 corresponds to a block in current picture 120. Areas 132 and 134 correspond to two background areas. Block 112 would be a matched block for block 122 if block 112 were not located at the boundary between a foreground area and background areas (indicated by references 132 and 134). Therefore, current block 122 cannot find a good matched block in the reference picture.

Figure 2:
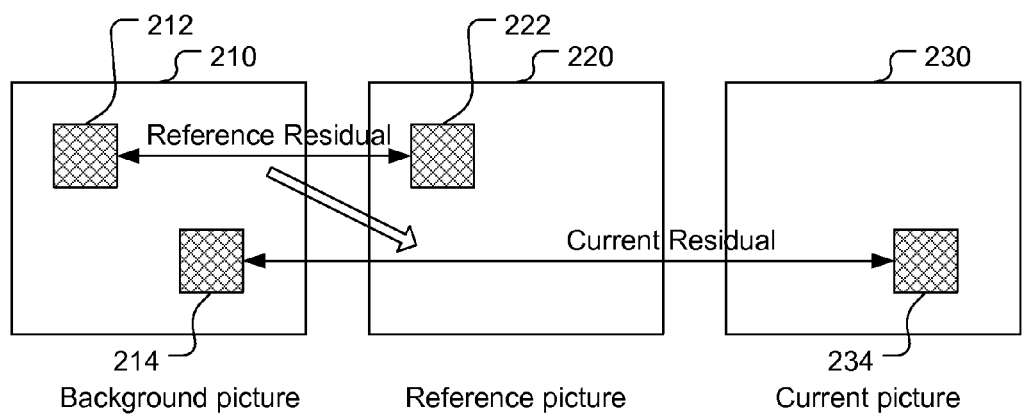
FIG. 2 illustrates a simplified example of background residual prediction process, where the background residual for a reference block is used to predict the background residual for a current block.

Accordingly, embodiments of the present invention disclose a background residual prediction technique. FIG. 2 illustrates a simplified diagram to explain the background residual prediction process. Boxes 210, 220 and 230 correspond to the background picture, the reference picture and the current picture respectively. Block 234 is a current block in the current picture (230) and block 222 is the reference block in the reference picture (220). The corresponding blocks in the background picture for block 234 and block 222 are indicated by block 214 and block 212 respectively. Block 212 is also referred to as a background reference block and block 214 is referred to as a background current block in this disclosure. The pixel values for each block is represented by a matrix with local coordinates x and y. The pixel value of the current block (234) at [x,y] is represent by CurrentMatrix[x,y] and the pixel value of the reference block (222) at [x,y] is represent by RefMatrixFw[x,y]. The corresponding blocks in the background picture are represented as BgcMatrix[x,y] and BgrMatrix[x,y] respectively for the current block and the reference block. The reference residual corresponds to (RefMatrixFw[x,y]−BgrMatrix[x,y]) and the current residual corresponds to (CurrentMatrix[x,y]−BgcMatrix[x,y]) as shown in FIG. 2. When the reference residual is used to predict the current residual, the predictor for the current block is determined from the reference block, the background reference block and the background current block.

The background picture can be selected from a decoded picture or generated from a group of decoded pictures. The present invention for background residual prediction may utilize any known techniques to generate the background picture.

An exemplary procedure of the adaptive background residual prediction according to an embodiment of the present invention is shown in the follow pseudo code:
for each pixel in the matrix if(abs(RefMatrixFw[x,y]−BgrMatrix[x,y])<=BgDiff-
    PredThreshold)

PredMatrixFw[x,y]=Clip3(0,255,RefMatrixFw[x,y]−
    BgrMatrix[x,y]+BgcMatrix[x,y])  (1)

else

PredMatrixFw[x,y]=RefMatrix[x,y],  (2)

where PredMatrixFw[x,y] corresponds to the predictor for the current block, and BgDiffPredThreshold corresponds to a threshold for selecting predictor according to equation (1) or equation (2). The predictor according to equation (1) corresponds to a sum of the background residual for the reference block (i.e., RefMatrixFw[x,y]−BgrMatrix[x,y]) and the background block for the current block (i.e., BgcMatrix[x,y]). The sum is then clipped within a range from 0 to 255. While a specific form (i.e., RefMatrixFw[x,y]−BgrMatrix[x,y]+BgcMatrix[x,y]) is used as an example of background residual prediction, other forms may also be used. For example, some weighting factors and a linear combination may be used.

Figure 3:
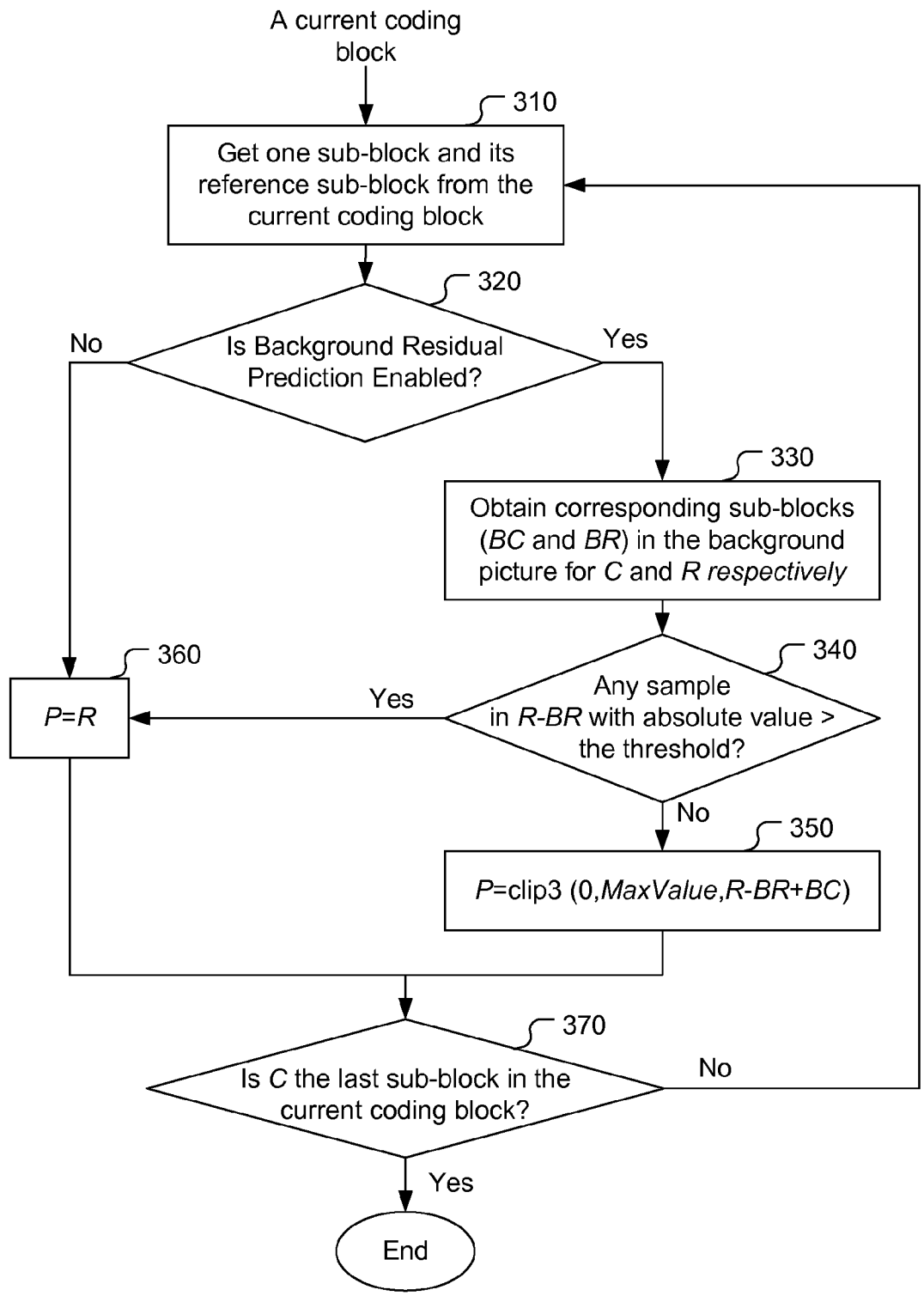
FIG. 3 illustrates an exemplary flowchart of adaptive background residual prediction process according to one embodiment of the present invention.

The background residual prediction procedure can also be described using the exemplary flowchart in FIG. 3. Embodiments according to the present invention allow each current coding block to be partitioned into sub-blocks and the current coding block is processed sub-block by sub-block. The sub-block can be an M×N block, where M and N are positive integers. Let C be the sample matrix of the current coding sub-block, P be the predicted sub-block for C, R be sample matrix in the reference block for the current sub-block C, BR be the sub-block in background picture corresponding to R, and BC be the sub-block in the background picture corresponding to C.

A threshold and the sub-block size have to be decided for the background residual prediction. Encoders and decoders may either utilize default values or incorporate the block size and threshold in video stream. The threshold can be determined according to system parameters. For example, the threshold can be set to 40 for a system with the sub-block size of 4×4. In another example, the threshold can be set to 255 when the sub-block size is set 1×1. The threshold may also be determined empirically using some typical video test data. The threshold may also be determined as a tradeoff between the performance and the encoding/decoding time. Furthermore, a system can adaptively enable the background residual prediction as indicated by a background residual prediction enabling flag. The flag can be signalized at Coding Block level when the width and height of the Coding Block is larger than 8.

Upon the determination of threshold and sub-block size, a current coding block is provided for the background residual prediction. A sub-block from the current coding block and its reference sub-block are provided in step 310. The reference sub-block R of the current coding sub-block C is obtained by fetching the sub-block locating at the position pointed to by the motion vector of C. In the encoder, the motion vector can be derived using motion estimation (ME) in the picture domain or in the background residual domain. When the ME is performed in the picture domain, the ME matches the current coding block with one or more reference blocks in one or more reference pictures respectively. When the ME is performed in the background residual domain, the ME is performed based on the background reference residual and the background current residual. The background reference residual corresponds to the differences between the reference picture and the background picture. The background current residual corresponds to the differences between the current picture and the background picture. In this case, the ME matched a current block in background current residual corresponding to the current coding block with the background reference residual to find a block with a best match for the current block. In the decoder side, the motion vector is decoded from the video stream as a coding system using the conventional ME. The background prediction enable flag is checked in step 320. If the flag indicates that the background residual prediction is not enabled (i.e., the "No" path), the predictor P is set to R as shown in step 360.

If the flag indicates that the background residual prediction is enabled (i.e., the "Yes" path), the corresponding sub-blocks (BC and BR) in the background picture for C and R respectively are obtained as shown in step 330. The difference between R and BR is check to determine whether any absolute value of (R−BR) is greater than the threshold as shown in step 340. If any absolute value of (R−BR) is greater than the threshold (i.e., the "Yes" path), the predictor is set to R, i.e., P=R as shown in step 360. Otherwise (i.e., the "No" path), the predictor P is set to P=clip3 (0, MaxValue, R−BR+BC) as shown in step 350. After the predictor is selected according to step 350 or step 360, the process checks whether the current sub-block C is the last sub-block in the current coding block as shown in step 370. If the current sub-block C is the last sub-block in the current coding block (i.e., "Yes" path), the process is terminated. Otherwise (i.e., the "No" path), the process goes to step 310 for the next sub-block. In step 350, clip3 (x,y,z) corresponds to a clipping function that clips value z to the range from x to y. The MaxValue corresponds to the largest valid value for the video data.

In the exemplary flowchart of FIG. 3, the decision regarding selection of the predictor for the current sub-block corresponding to step 350 or step 360 is based on whether there is any absolute value of (R−BR) greater than the threshold. However, other means for selecting the predictor for the current sub-block corresponding to step 350 or step 360 may also be used. For example, the number of pixels in (R−BR) that have the absolute value exceeding the threshold can be counted. If the number is equal to or larger than a second threshold, the prediction according to step 360 is selected. Otherwise, the prediction according to step 350 is used. Accordingly, the decision associated with step 340 corresponds to the case that the second threshold is set to 1.

While the absolute value of (R−BR) is used in the example of FIG. 3, other error measurement may also be used. For example, the sum of absolute differences (SAD) or the mean squared error (MSE) between R and BR can be used. If the SAD or the MSE is larger than a threshold, the prediction according to step 360 is used. Otherwise, the prediction according to step 350 is used.

Figure 4:
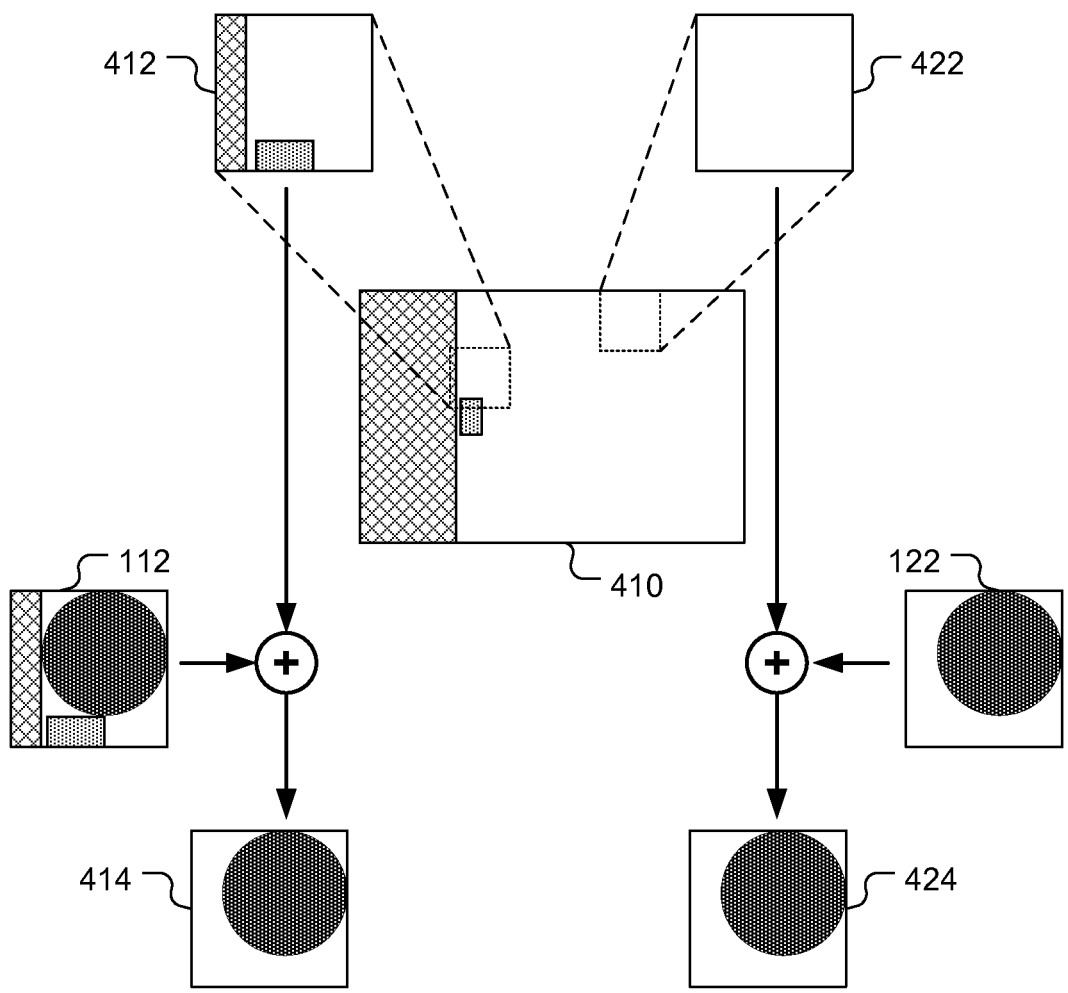
FIG. 4 illustrates an exemplary block diagram of adaptive background residual prediction process, where the background residual for a reference block is used to predict the background residual for a current block.

FIG. 4 illustrates an exemplary block diagram of background residual prediction according to the present invention. Frame 410 corresponds to a background picture. Background reference sub-block 412 is the corresponding sub-block in the background picture for the reference sub-block (112) of FIG. 1. Background current sub-block 422 is the corresponding sub-block in the background picture for the current sub-block (122) of FIG. 1. The background reference residual (414) is formed by subtracting the background reference block (412) from the reference sub-block (112). Similarly, the background current residual (424) is formed by subtracting the background current sub-block (422) from the current sub-block (122). As shown in FIG. 4, the background reference residual (414) represents a very good predictor for the background current residual (424). If similar notations for FIG. 3 are adopted for FIG. 4, the background current residual (424) corresponds to (C−BC) and the background reference residual (414) corresponds to (R−BR). When the background current residual (424) is predicted by the background reference residual (414), the remaining prediction residual, Δ becomes Δ=(C−BC)−(R−BR). The current sub-block C can be represented by C=(R−BR)+BC+Δ. In other words, the predictor for the current sub-block according to background residual prediction is ((R−BR)+BC).

Embodiments according to the present invention may signal the use of the background residual prediction in the bitstream. The signaling may indicate the use of the background residual prediction as an additional prediction mode or the system may use an additional flag to indicate the use of the background residual prediction. The system may also use flags to indicate whether the sub-blocks within a coding block are coded using the adaptive background residual prediction.

The adaptive background residual prediction enable flag can be incorporated in a picture level (e.g., in picture parameter set, PPS) or in a slice level (e.g., a slice header). If the flag in the picture level indicates that the background residual prediction is enabled, the adaptive background residual prediction is applied to the whole picture. If the flag in the slice level indicates that the background residual prediction is enabled, the adaptive background residual prediction is applied to the whole slice. The flag may also be signalled for each coding block to indicate whether the background residual prediction is enabled for the coding block. However, when a coding block is coded in the Merge mode or the Skip mode, there is no need to signal the use of adaptive background residual prediction. When a coding block is predicted using multiple prediction units, the background residual prediction enable flag will not be used. In other words, the background residual prediction enable flag is signalled only when the coding block is predicted by a whole prediction unit. When the coding block size is small, the bitrate overhead associated with the background residual prediction enable flag may become large. Accordingly, the adaptive background residual prediction enable flag will be signalled only for coding blocks with block width or height larger than W, where W may be set to 8 or 16.

Figure 5:
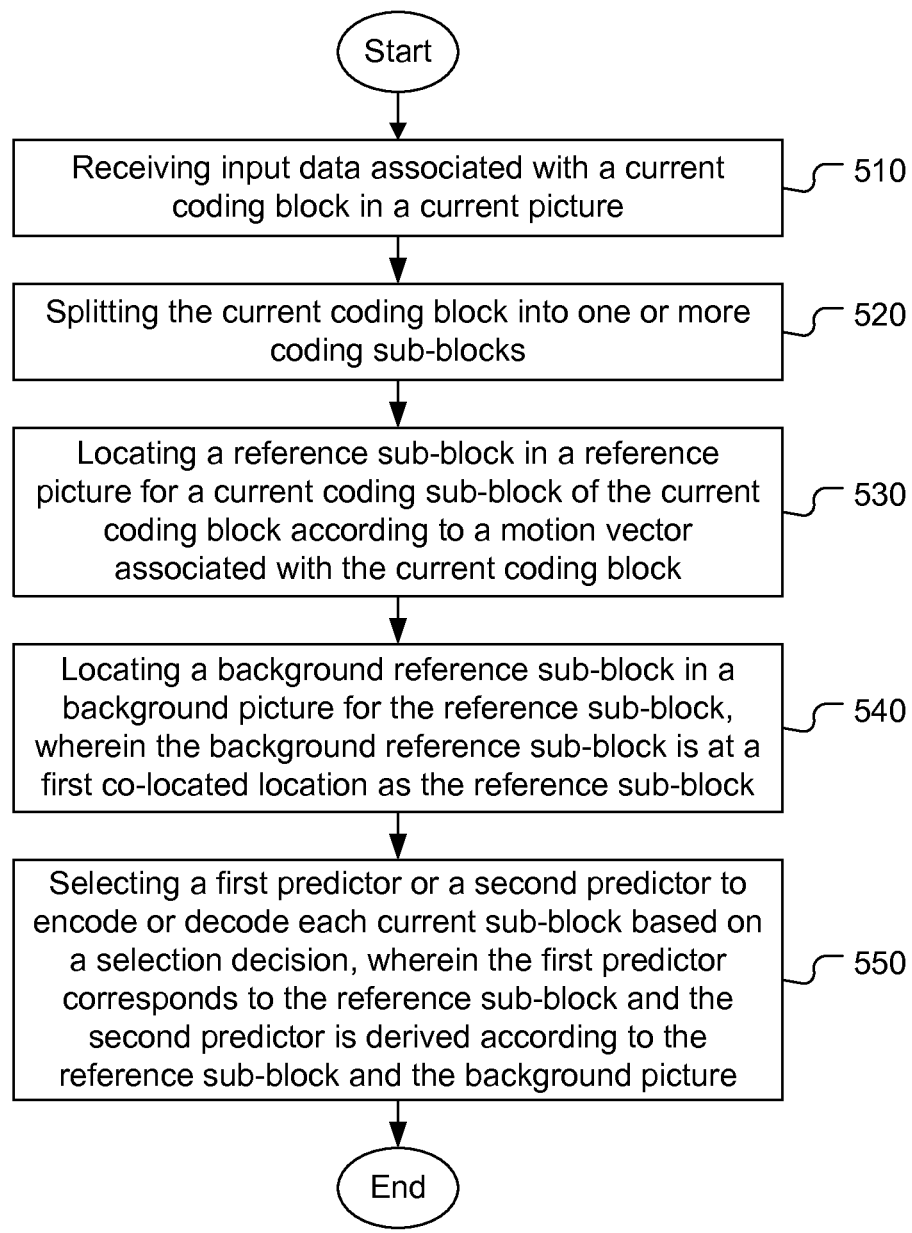
FIG. 5 illustrates an exemplary flowchart of a coding system incorporating the adaptive background residual prediction process according to an embodiment of the present invention.

FIG. 5 illustrates an exemplary flowchart of a video encoding or decoding system incorporating adaptive background residual prediction according to an embodiment of the present invention. The system receives input data associated with a current coding block in a current picture in step 510. For encoding, the input data corresponds to video data to be encoded. For decoding, the input data corresponds to coded data to be decoded. The input data may be retrieved from memory (e.g., computer memory, buffer (RAM or DRAM) or other media) or from a processor. The current coding block is split into one or more coding sub-blocks s as shown in step 520. A reference sub-block in a reference picture is located for a current coding sub-block of the current coding block according to a motion vector associated with the current coding block as shown in step 530. A background reference sub-block in a background picture is located for the reference sub-block as shown in step 540, where the background reference sub-block is at a first co-located location as the reference sub-block. A first predictor or a second predictor is then selected to encode or decode the current sub-block based on a selection decision as shown in step 550, where the first predictor corresponds to the reference sub-block and the second predictor is derived according to the reference sub-block and the background picture.

The flowchart shown above is intended to illustrate an example of adaptive background residual prediction according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding or decoding utilizing adaptive background residual prediction, the method comprising:
receiving input data associated with a current coding block in a current picture;
splitting the current coding block into one or more coding sub-blocks;
locating a reference sub-block in a reference picture for a current sub-block of the current coding block according to a motion vector associated with the current coding block;

locating a background reference sub-block in a background picture for the reference sub-block, wherein the background reference sub-block is positioned at a first set of location coordinates ($x_1$, $y_1$) in the background picture, and the reference sub-block is positioned at the same first set of location coordinates ($x_1$, $y_1$) in the reference picture; and selecting a first predictor or a second predictor to encode or decode the current sub-block based on a selection decision, wherein the first predictor corresponds to the reference sub-block and the second predictor is derived according to the reference sub-block and the background picture.

2. The method of claim 1, wherein the background picture is generated based on one or more decoded pictures.

3. The method of claim 1, wherein the selection decision is derived based on the reference sub-block and the background reference sub-block.

4. The method of claim 3, wherein a sum of absolute differences (SAD) or a mean squared error (MSE) between the reference sub-block and the background reference sub-block is derived, and the first predictor is selected if the SAD or the MSE is greater than a threshold and the second predictor is selected if the SAD or the MSE is smaller than the threshold.

5. The method of claim 3, wherein absolute differences between the reference sub-block and the background reference sub-block are derived, the first predictor is selected if a number of absolute differences exceeding a threshold is larger than a selected number and the second predictor is selected otherwise, and wherein the selected number corresponds to a non-negative integer.

6. The method of claim 1, wherein the selection decision is indicated by a flag.

7. The method of claim 1, further comprising incorporating a syntax element in an encoder side or parsing the syntax element in a decoder side, wherein the syntax element indicates whether to enable adaptive background residual prediction.

8. The method of claim 7, wherein the syntax element is incorporated in a picture level or a slice header level of a video bitstream to control selection of the adaptive background residual prediction for a respective picture or slice.

9. The method of claim 7, wherein the syntax element is incorporated in coded data for the current coding block to control selection of the adaptive background residual prediction for the current coding block.

10. The method of claim 9, wherein said incorporating the syntax element in the encoder side and said parsing the syntax element in the decoder side are skipped for the current coding block if the current coding block is coded using Merge mode or Skip mode.

11. The method of claim 9, wherein said incorporating the syntax element in the encoder side and said parsing the syntax element in the decoder side are skipped for the current coding block if the current coding block is predicted using prediction units smaller than the current coding block.

12. The method of claim 9, wherein said incorporating the syntax element in the encoder side and said parsing the syntax element in the decoder side are skipped for the current coding block if width or height of the current coding block is equal to or smaller than a selected size, wherein the selected size corresponds to a positive integer.

13. The method of claim 12, wherein the selected size is eight or sixteen.

14. The method of claim 1, wherein width of the current sub-block is from 1 to picture width and height of the current sub-block is from 1 to picture height.

15. The method of claim 1, wherein the second predictor corresponds to a linear combination of the reference sub-block, the background reference sub-block and a background current sub-block in the background picture, and wherein the background current sub-block is positioned at a second set of location coordinates ($x_2$, $y_2$) in the background picture, and the current sub-block is positioned at the same second set of location coordinates ($x_2$, $y_2$) in the current picture.

16. The method of claim 15, wherein the second predictor is set to a sum of a reference residual and the background current sub-block, and wherein the reference residual is derived by subtracting the background reference sub-block from the reference sub-block.

17. The method of claim 1, wherein the motion vector associated with the current coding block is derived in a picture domain or a background residual domain, wherein the current picture and the reference picture are used to derive the motion vector for the picture domain, and current background residual data and reference background residual data are used to derive the motion vector for the background residual domain, the current background residual data corresponds to first differences between the current picture and the background picture, and the reference background residual data corresponds to second differences between the reference picture and the background picture.

18. An apparatus for video encoding or decoding utilizing adaptive background residual prediction, the apparatus comprising one or more electronic circuits configured to:

receive input data associated with a current coding block in a current picture;

split the current coding block into one or more coding sub-blocks;

locate a reference sub-block in a reference picture for a current sub-block of the current coding block according to a motion vector associated with the current coding block;

locate a background reference sub-block in a background picture for the reference sub-block, wherein the background reference sub-block is positioned at a first set of location coordinates ($x_1$, $y_1$) in the background picture, and the reference sub-block is positioned at the same first set of location coordinates ($x_1$, $y_1$) in the reference picture; and select a first predictor or a second predictor to encode or decode the current sub-block based on a selection decision, wherein the first predictor corresponds to the reference sub-block and the second predictor is derived according to the reference sub-block and the background picture.

19. A method of video encoding or decoding utilizing adaptive background residual prediction, the method comprising:

receiving input data associated with a current coding block in a current picture;

splitting the current coding block into one or more coding sub-blocks;

locating a reference sub-block in a reference picture for a current sub-block of the current coding block according to a motion vector associated with the current coding block;

locating a background reference sub-block in a background picture for the reference sub-block, wherein the background reference sub-block is positioned at a first set of location coordinates $(x_1, y_1)$ in the background picture, and the reference sub-block is positioned at the same first set of location coordinates $(x_1, y_1)$ in the reference picture;

locating a background current sub-block in a background picture, wherein the background current sub-block is positioned at a second set of location coordinates $(x_2, y_2)$ in the background picture, and the current sub-block is positioned at the same second set of location coordinates $(x_2, y_2)$ in the current picture;

calculating a predictor for the current sub-block according to the reference sub-block, the background reference sub-block, and the background current sub-block; and encoding or decoding the current sub-block using the predictor.

20. The method of claim 19, further comprising incorporating a syntax element in an encoder side or parsing the syntax element in a decoder side, wherein the syntax element indicates whether to enable adaptive background residual prediction.

21. The method of claim 19, wherein the predictor is set to a sum of a reference residual and the background current sub-block, and wherein the reference residual is derived by subtracting the background reference sub-block from the reference sub-block.

22. The method of claim 19, wherein the motion vector associated with the current coding block is derived in a picture domain or a background residual domain, wherein the current picture and the reference picture are used to derive the motion vector for the picture domain, and current background residual data and reference background residual data are used to derive the motion vector for the background residual domain, the current background residual data corresponds to first differences between the current picture and the background picture, and the reference background residual data corresponds to second differences between the reference picture and the background picture.

* * * * *